May 18, 1965   G. R. ASCHAUER   3,184,025
CENTRIFUGALLY OPERATED ACTUATING MECHANISM
Filed Aug. 30, 1963
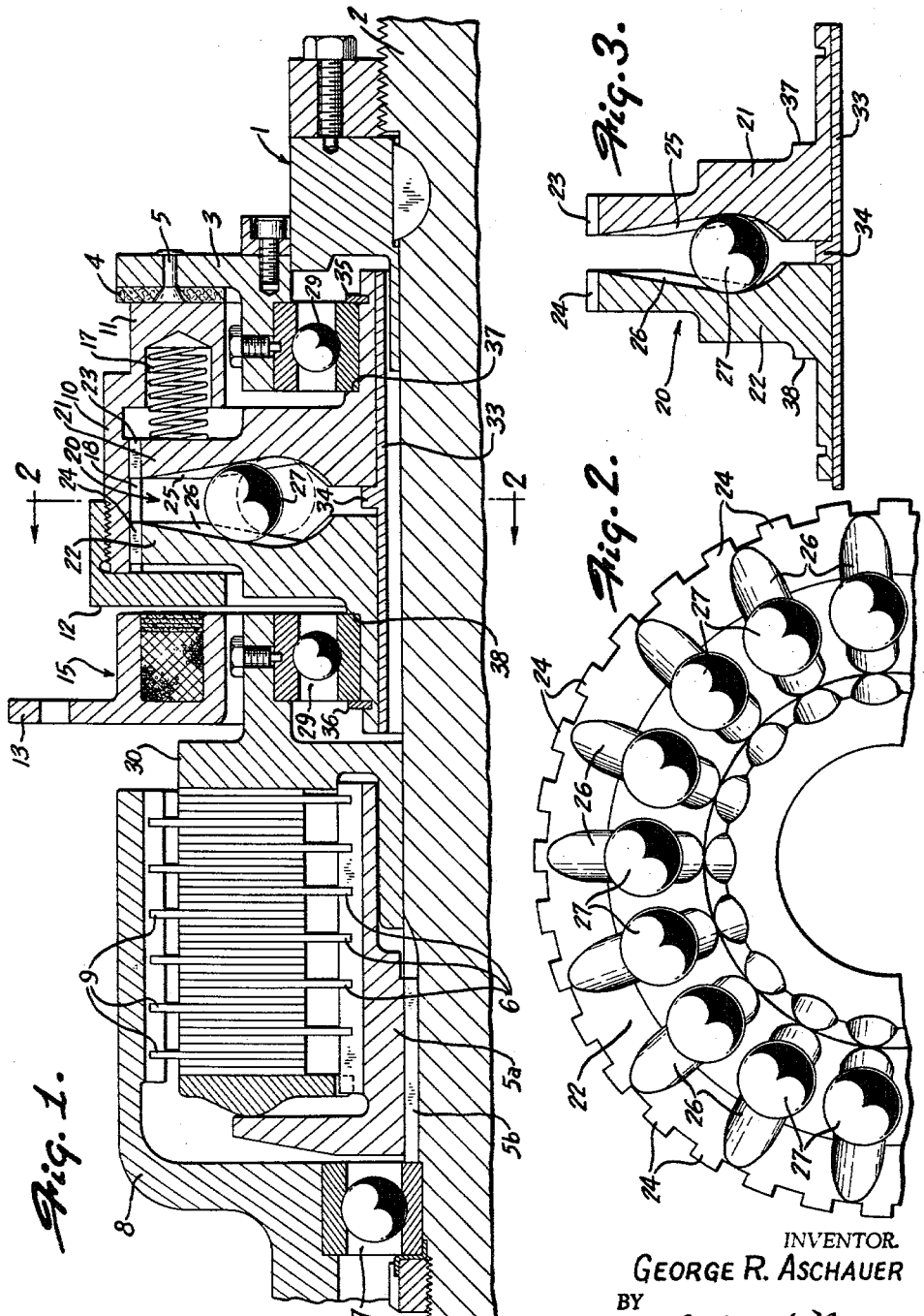
INVENTOR.
GEORGE R. ASCHAUER
BY
Lieber & Nilles
ATTORNEYS

United States Patent Office 3,184,025
Patented May 18, 1965

3,184,025
CENTRIFUGALLY OPERATED ACTUATING
MECHANISM
George R. Aschauer, Racine, Wis., assignor to Twin Disc
Clutch Company, Racine, Wis., a corporation of
Wisconsin
Filed Aug. 30, 1963, Ser. No. 305,730
4 Claims. (Cl. 192—105)

This invention relates to actuating devices of the type in which centrifugal force is utilized to cause axial relative movement of the action or actuating parts. The present invention finds particular but not exclusive utility in a clutching device.

In accordance with the present invention, an improved actuating mechanism is provided having axially separable action parts which are separated due to centrifugal force causing radial displacement of a force transmitting medium, such as a plurality of balls; the action parts are mounted independently of either the drive or actuated members, and the speed of the mechanism can be infinitely varied. The arrangement is such that the greater the speed of the mechanism, the greater is the actuating force provided by the force transmitting medium.

Generally, the present invention provides an efficient actuating mechanism which can be independently and infinitely variably controlled at any desired speed.

These and other objects and advantages of the present invention will appear hereinafter as this disclosure progresses, reference being had to the accompanying drawings, in which:

FIGURE 1 is a longitudinal cross-sectional view through a centrifugal clutch embodying the present invention;

FIGURE 2 is a transverse sectional view taken along line 2—2 in FIGURE 1; and

FIGURE 3 is an enlarged fragmentary view of the action parts shown in FIGURE 1.

Referring in greater detail to the drawings, the actuating mechanism provided by the present invention has been shown as applied to and for actuating a clutch device, but the actuating mechanism finds utility in other devices wherein a shiftable part is to be actuated.

The mechanism shown in FIGURE 1 includes a rotatable drive member 1 which takes the form of a shaft 2 having secured thereon a clutch supporting member 3. A clutch surface 4 is secured to the member 3 by rivets 5.

An actuatable member in the form of a clutching mechanism is located along shaft 2 at a location axially spaced from the clutch surface 4. More particularly, a spider 5a is splined to shaft 2 as at 5b, and to which spider is secured a series of friction discs 6 in the conventional manner. Mounted on an antifriction bearing 7 is the driven cup 8 to which is also splined a series of friction discs 9. The interleaved discs 6 and 9 when axially pressed together act to transmit power from the spider 5a to the driven cup 8 in the known manner.

Alternatively, instead of a clutching mechanism, the present invention to be described may be used in a thruster wherein it is simply desired to move or control a flap in a space craft or the like, rather than provide a specific clutching function.

A cylindrical sleeve-like pressure member 10 is provided for selective engagement with the drive member 1. More particularly, the portion 11 of the pressure member is engageable with the clutch surface 4 of the drive member in any desired degree, and this clutching action thereby rotatably drives the pressure member at any speed up to and including the maximum speed of the drive member, depending upon the degree in which the pressure member is clutched or forced against the clutch surface 4.

The pressure member 10 includes a surface 12 which is engageable by the brake member 15. More specifically, the brake member 15 may be of the electrical coil type and which is externally actuated either manually or automatically through the flange member 13. In other words, the brake member 15 can be energized to thereby cause the pressure member 10 to be withdrawn to the left and away from the clutch surface 4. In other words, when the brake is fully energized, the pressure member 10 is fully retracted from the clutch surface, and therefore no drive is transmitted from the drive member 1 to the driven cup 8. Alternatively, when the brake is de-energized or released, the pressure member is urged under the influence of the spring 17 to the right as viewed in FIGURE 1 and thereby causes engagement of the pressure member 10 with the clutch surface 4.

With this present arrangement, the coil can be de-energized as slowly as desired, and any particular speed of the mechanism can be held for any desired length of time. Any percentage of the total clutching effort can be obtained.

The pressure member also has a series of axial splines 18.

Actuating means 20 are mounted between the pressure member and the actuatable member as follows: The actuating means includes a pair of identical but oppositely positioned spiders 21 and 22 which have external splines 23, 24, respectively, around their periphery. These splines mesh with the splines 18 of the pressure member. The spiders have oppositely facing cam tracks 25 and 26 between which are located the pressure producing media such as the steel balls 27. It should be noted here that other pressure producing media could be used, and these media act under the influence of centrifugal force to cause relative axial separation of the spiders 21 and 22. In other words, centrifugal force causes radial outward displacement of the pressure producing media 27, which in turn causes axial separation of the spiders. The spiders being splined to the pressure member are rotatably driven thereby at the speed determined by the amount of clutching between the pressure member and the clutch surface 4. Thus, as the rotative speed of the pressure member increases, so also does the clamping effort or axial force of the pressure transmitting media.

It will be noted that the spiders and their intermediate steel balls are mounted by antifriction bearing assemblies 28 and 29 to the drive member 1 and the plate assembly 30 of the actuatable member such as the clutch mechanism shown for illustrative purposes. It will thus be noted that the spiders and their intermediate balls, which can be considered as the action parts, are rotatably mounted or supported on and between the actuatable member and the drive member, and these action parts are independently rotatable relative to the supporting members. The spiders are mounted on a sleeve 33 which has a stop member 34 located between the spiders. Thus, the spiders are free to slide relative to one another within limits. Snap rings 35, 36 are located on their respective spiders and hold their respective ball bearing assemblies 28 and 29 against the shoulders 37, 38 of the spider members.

Axial separation of the spiders thus causes the plate member 30 to be shifted to the left as viewed in FIGURE 1 and consequently causes engagement of the interleaved discs.

With the present invention, the actuatable member can be infinitely controlled as to speed and at any speed from zero up to the maximum speed of the drive member 1. The speed at which the pressure member 10 is driven is dependent upon the amount of its clutching action against surface 4 as determined by the engaging means 15. The action parts are driven at the same rotative speed as their associated pressure members, and the greater this speed, the greater is the centrifugal force and consequently the clamping action of the pressure transmitting media 27. The pressure transmitting media 27 assumes a given radial position for any fully engaged position of the actuatable member, but the actuating or clamping force which these media produce depends on the centrifugal force acting on them, and thus the greater the speed, the greater the clamping force of the pressure transmitting media. In other words, the more speed that is applied to this mechanism, the more centrifugal pressure and clamping action are provided by the balls.

Different engaging means may be utilized other than the electrical coil 15; for example, the pressure member 10 may be braked by other means, such as a spot brake which opposes the clutch engaging springs 17.

Furthermore, as previously indicated, other pressure transmitting media may be employed other than the balls 27 shown—for example, oil, mercury, or small balls embedded in rubber may serve to be centrifugally loaded by the rotation of the unit.

Various modes of carrying out the invention are contemplated as being within the scope of the following claims particularly pointed out and distinctly claiming the subject matter which is regarded as the invention.

I claim:

1. An actuating mechanism comprising a rotatable drive member, an axially slidable, cylindrical, sleeve-like pressure member selectively engageable with said drive member; engaging means for selectively engaging said pressure member with said drive member for infinitely varying the rotative speed of said pressure member; an actuatable member; and a centrifugally operated actuating means mounted between and connecting said pressure member and said actuatable member for causing actuation of said actuatable member with a force which is dependent on the rotative speed of said pressure member as determined by said engaging means; said actuating means comprising, a pair of action parts located within and connected to said cylindrical pressure member for rotation thereby, said parts being splined to said pressure member for rotation therewith and being relatively axially separable to cause actuation of said actuatable member, and means between said action parts and radially shiftable by centrifugal force due to rotation of said pressure member to cause said axial separation of said action parts; and means for rotatably supporting said action parts for rotation independently of said actuatable member and said drive member.

2. Mechanism as defined in claim 1 further characterized in that said engaging means comprises an electrical coil type brake member, said actuatable member comprises clutch packs, and spring means acting between said action parts and said pressure member and biasing the latter into engagement with said drive member, said coil type brake member acting to selectively permit engagement of said pressure member against said drive member and acting against the bias of said spring means.

3. An actuating mechanism comprising, a rotatable drive member including a clutch surface, an axially shiftable cylindrical sleeve-like pressure member engageable with said clutch surface, engaging means for causing variable engagement of said pressure member with said surface for infinitely varying the rotative speed of said pressure member, an actuatable member, and centrifugally operated actuating means located within and drivingly connected to said pressure member and supportingly mounted on said actuatable member and on said drive member for rotation independently of both, whereby rotation of said actuating means causes actuation of said actuatable member with a force which is dependent on the rotative speed of said pressure member as determined by said engaging means; said actuating means comprising a pair of action parts having axially spaced surfaces which are oppositely disposed in an axial direction, and pressure transmitting media between and bearing against said surfaces, said parts being connected to said pressure member for rotation thereby and being relatively axially separable to cause actuation of said actuatable member, said media between said action part surfaces being radially shiftable due to rotation of said pressure member to cause said axial separation of said action parts.

4. Mechanism as defined in claim 3 further characterized in that said engaging means comprises an electrical coil type brake member, and spring means biasing the pressure member into engagement with said clutch surface, said brake member acting to vary the driving engagement between said pressure member said said drive member.

References Cited by the Examiner

UNITED STATES PATENTS 2,074,510 3/37 Junkers.
2,447,007 8/48 Gravina et al.
2,987,155 6/61 Maurice et al.

FOREIGN PATENTS 1,093,010 3/54 France.

DAVID J. WILLIAMOWSKY, *Primary Examiner.*